United States Patent [19]
Falbel

[11] Patent Number: 6,098,929
[45] Date of Patent: Aug. 8, 2000

[54] THREE AXIS ATTITUDE READOUT SYSTEM FOR GEOSYNCHRONOUS SPACECRAFT

[76] Inventor: Gerald Falbel, 472 Westover Rd., Stamford, Conn. 06902

[21] Appl. No.: 09/014,506

[22] Filed: Jan. 28, 1998

[51] Int. Cl.[7] .................................................. B64G 1/36
[52] U.S. Cl. .................... 244/171; 250/206.2; 701/226; 356/141
[58] Field of Search ................ 244/158 R, 171, 244/164–169, 172; 250/206.2; 701/226, 222, 13, 4; 73/1.79; 356/141, 152

[56] References Cited

U.S. PATENT DOCUMENTS

| | | | |
|---|---|---|---|
| 4,618,259 | 10/1986 | Czichy et al. ........................... | 356/152 |
| 5,108,050 | 4/1992 | Maute ..................................... | 244/164 |
| 5,109,346 | 4/1992 | Wertz ..................................... | 244/164 |
| 5,189,295 | 2/1993 | Falbel .................................. | 244/158 R |
| 5,277,385 | 1/1994 | Flament .................................. | 244/164 |
| 5,412,574 | 5/1995 | Bender et al. .......................... | 244/164 |
| 5,508,932 | 4/1996 | Achkar et al. .......................... | 244/164 |
| 5,749,545 | 5/1998 | Gnatjuk .................................. | 244/164 |

*Primary Examiner*—Galen L. Barefoot
*Attorney, Agent, or Firm*—Mark P. Stone

[57] ABSTRACT

A three axis attitude readout system for geosynchronous spacecraft operating at geosynchronous and other orbit altitudes has a two axis sun sensor, a two axis Polaris star tracker, and an infrared single axis earth sensor for use when the sun is behind the earth. The three sensors cooperate with each other such that each sensor has characteristics overcoming inherent weaknesses in the other sensors. The overall system results in a highly accurate three axis readout which could not be achieved by using any of the three sensors alone. The sensor system is designed to be of low weight, low volume and low power consumption.

21 Claims, 11 Drawing Sheets

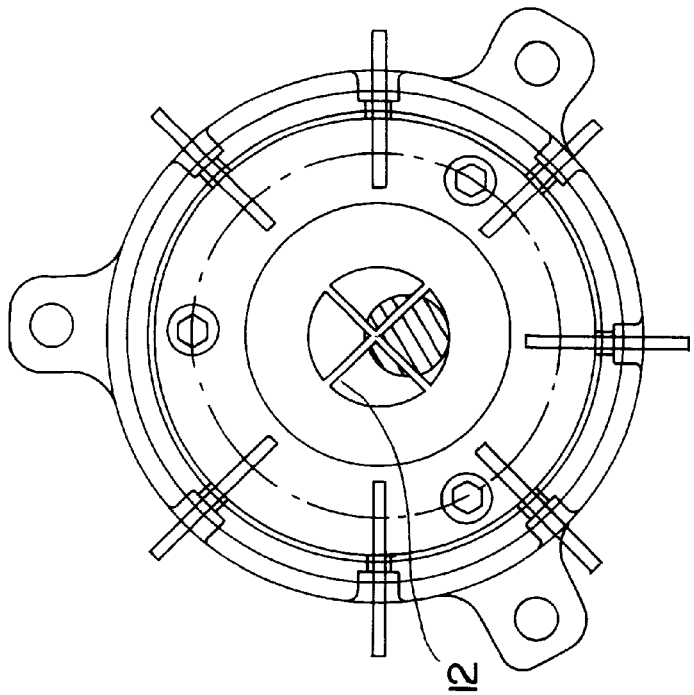
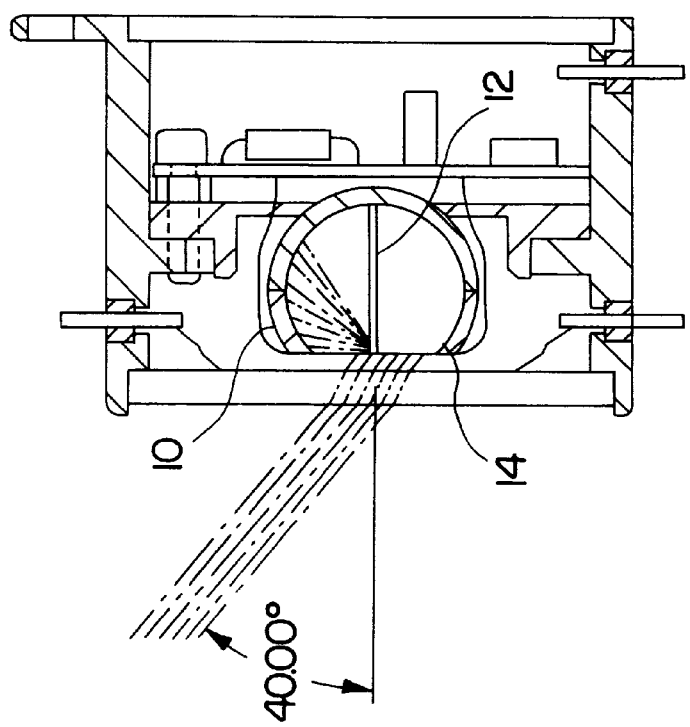
FIG.2A-2
FIG.2A-1

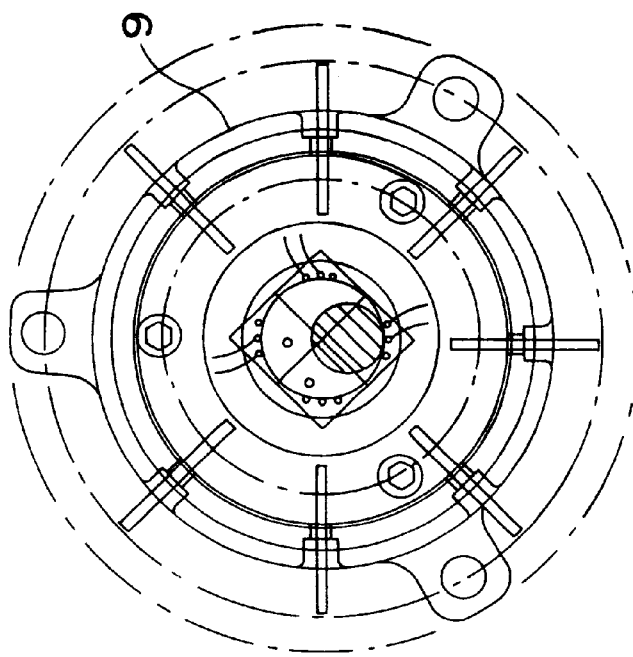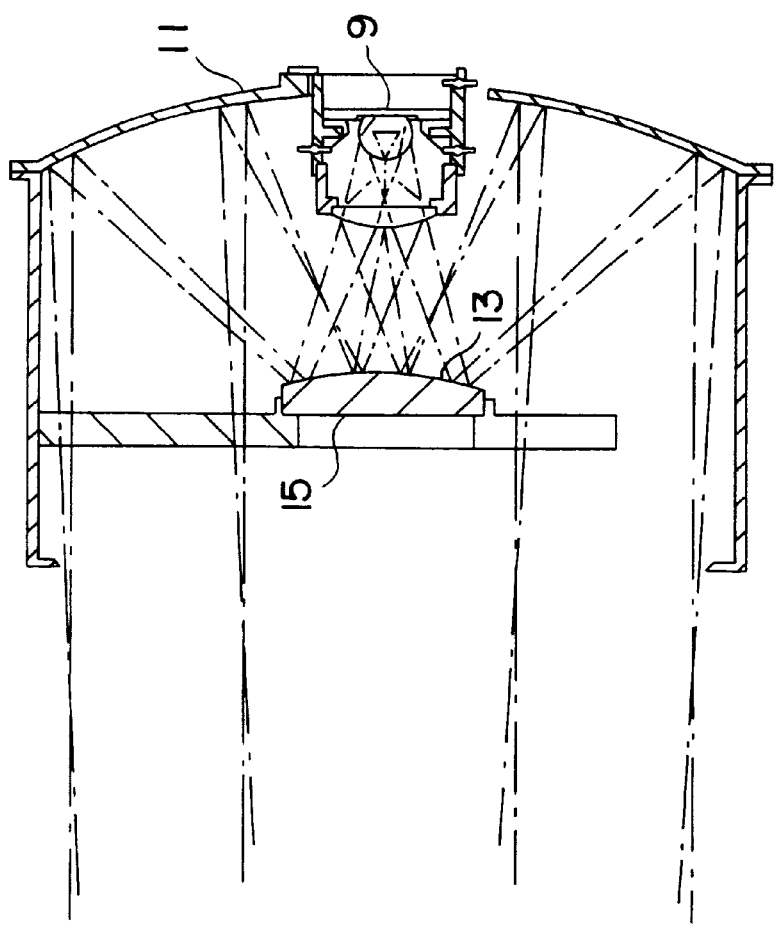

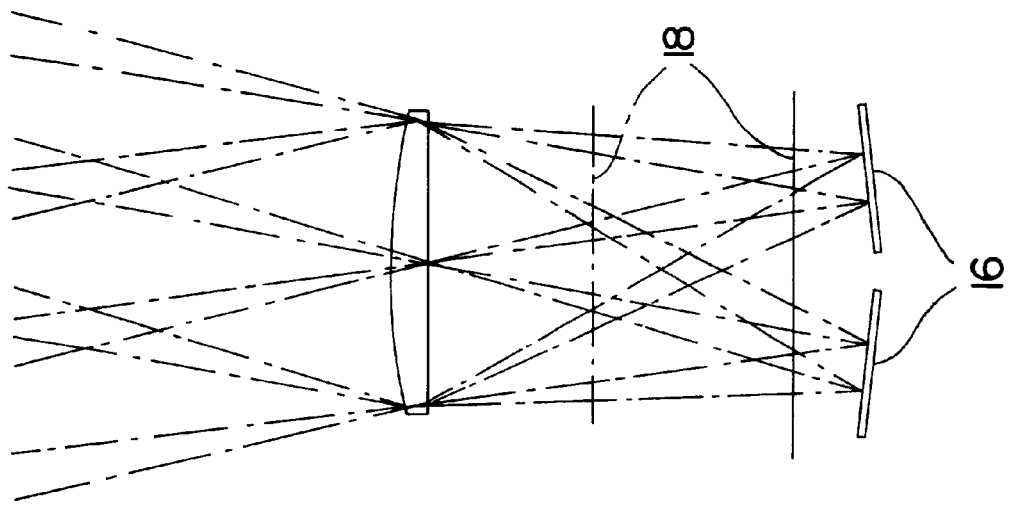
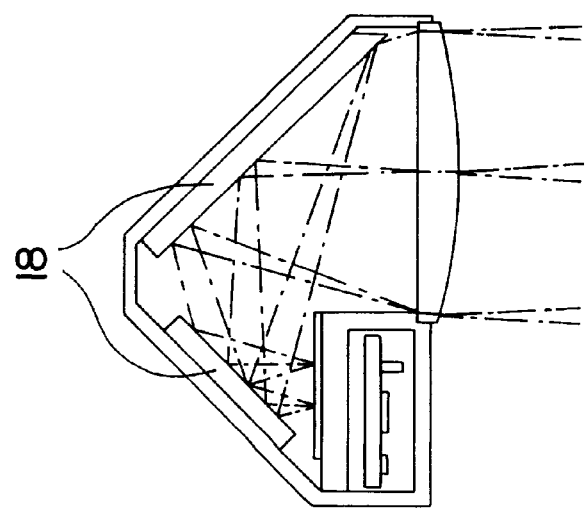

THREE AXIS ATTITUDE READOUT SYSTEM FOR GEOSYNCHRONOUS SPACECRAFT

BACKGROUND OF THE INVENTION

The present invention is directed to a sensor system designed primarily for geosynchronously orbiting spacecraft, although in slightly different configurations it can operate at all orbit altitudes. More specifically, the present invention is directed to improvements to attitude readout systems for geosynchronous orbiting spacecraft.

In order to successfully operate a spacecraft in geosynchronous orbit, the exact position of the spacecraft must be continuously maintained over a predesignated point on the earth, which is referred to as the spacecraft's allocated "slot". Through the use of an absolute clock, the spacecraft is able to precisely determine the location of the sun relative to the earth local vertical once the spacecraft is in its proper station. With this knowledge of the relative location of the sun, together with knowledge of the exact day/date of the year at four zones throughout the twenty-four hour orbit period, a two axis sun sensor has the capacity to provide three axis attitude information relative to the earth local vertical. However, a sun sensor cannot readout roll attitude at the spring and fall equinoxes when the sun is aligned with spacecraft roll axis (e.g., 9:00 a.m. and 3:00 p.m. local time), and the roll sensitivity significantly degrades at times of the year other than the equinoxes so that the sun sensor cannot readout the roll attitude near these local times. Similarly, the sun sensor cannot read out the yaw when the sun is at 12:00 noon local time. The sun sensor also cannot be used when the sun is behind the earth (21 days before and after both the spring and fall equinoxes) and other sensors must assume the attitude readout function.

A Polaris star sensor is based upon the same operating concept as that of a sun sensor, and uses the same detector and signal processing means as a sun sensor. Accordingly, a Polaris star sensor is a simple sensor in which Polaris recognition and acquisition is accomplished by the sun sensor. Accordingly, a Polaris star sensor can operate for a large part of the portion of the orbit of the spacecraft in which the sun is not behind the earth. During the sun-visible portion of the orbit, an infrared earth sensor is capable of providing a readout of the pitch attitude of the earth, and can hold the pitch attitude when the sun is behind the earth.

It is the primary object of the present invention to provide a sensor system designed primarily but not exclusively for geosynchronously orbiting spacecraft and having a three axis attitude readout system in which each of the sensors cooperates with other sensors in the system to emphasize advantages of each type of sensor and to compensate for inherent disadvantages in the other types of sensors employed in the overall system.

It is a further object of the present invention to provide a a sensor system primarily but not exclusively for geosynchronously orbiting spacecraft in which the overall sensor system is of low weight, low volume, low power consumption, and capable of being fabricated at a low cost.

Further objects and advantages of the invention will become apparent from the following description and discussion thereof.

SUMMARY OF THE INVENTION

The present invention is directed to a sensor system designed primarily but not exclusively for geosynchronously orbiting spacecraft, and in particular a three axis attitude readout system. The sensor system comprises three components—1). a two axis sun sensor; 2). a two axis Polaris star tracker; and 3). an infrared single axis earth sensor for use when the sun is behind the earth. The two axis sun sensor is capable of providing three axis attitude information relative to the earth local vertical through the use of an absolute clock (which provides the precise location of the sun relative to the earth local vertical once the spacecraft is in its proper station), and with information of the exact date of the year at four zones through the twenty-four hour orbit period of the spacecraft. However, the sun sensor cannot read out roll attitude at the spring and fall equinoxes when the sun is aligned with the spacecraft roll axis (9:00 a.m. and 3:00 p.m. local time). Even at other times of the year, roll sensitivity markedly degrades near these local times, and the sun sensor cannot read out the roll attitude. Similarly, the sun sensor cannot read out the yaw attitude at the local time of 12:00 noon when the sun is aligned with the spacecraft yaw axis, and the sun sensor cannot be used when the sun is behind the earth (twenty-one days before and after the spring and fall equinoxes). During this time, other sensors must take over the attitude readout function otherwise performed by the sun sensor.

In accordance with the present invention, a Polaris star sensor is included in the sensor system. The Polaris star sensor is based upon the same operating concept as a sun sensor and uses the same detector and signal processing means, resulting in a simple sensing device. Once Polaris is acquired, the system can operate to a specified degree of accuracy for a relatively large part of the portion of the spacecraft orbit in which the sun is not behind the earth (i.e., the sun-visible period). During the sun-visible period, an infrared earth sensor forms a component of the overall sensor system and concurrently reads pitch attitude of the earth together with the roll and yaw outputs available from the Polaris star sensor. During a portion of the orbit when the sun is behind the earth, (which is a maximum of one hour, ten minutes at the Equinoxes), the pitch attitude is held exclusively by the earth sensor and the roll and yaw readout is provided by the Polaris sensor. Therefore, the infrared earth sensor must hold its accuracy and minimize its thermal offsets only during the relatively short one hour and ten minute maximum sun occultation period. This greatly simplifies the earth sensor design parameter and test requirements.

The sensor system of the present invention comprises three separate sensors which cooperate with each other to read out the roll, yaw and pitch attitude during different portions of the orbit at different times of the year. The sun sensor provides a readout for roll and yaw attitude except for the roll and yaw attitude at the spring and fall equinoxes and at other times of the year when the sun is aligned with the spacecraft roll axis and spacecraft yaw axis. During these times, the Polar star sensor provides the readout for the roll and yaw attitudes. The infrared earth sensor concurrently reads the pitch attitude of the earth with the Polaris star sensor during the portion of the orbit that the sun is not behind the earth (the sun-visible period). During the portions of the orbit when the sun is behind the earth, which is a maximum period of one hour and ten minutes at the equinoxes, the pitch attitude is held exclusively by the earth sensor.

Therefore, in accordance with the present invention, the three components of the overall sensor system cooperate with each other to control different attitudes of the spacecraft during different portions of the spacecraft orbit and at different times of the year, such that each attitude parameter, is, at any time, being held by the most optimum sensor of the system under the existing conditions at any time period.

The outputs of each of the three sensors comprising the overall sensor system are high level, buffered, analog voltages, insensitive to electrical pick up in the cabling to the centrally located sampler and the analog to digital converter, which then transmits the signal to the spacecraft computer, or in the alternative to a central processor if one is provided. The analog to digital converter converts the outputs of each sensor of the overall sensor system into digital numbers, preferably at a 10 millisecond or faster rate, and transmits them to the spacecraft computer, together with calibration and offset corrections applicable to each of the sensors. The computer then generates the pitch, roll, and yaw readout angle outputs for the spacecraft attitude stabilization system. The cooperation between the three sensors of the overall sensor system, and the employment of each sensor during different portions of the orbit and/or year, results in a three axis readout which is more accurate than can be achieved by relying exclusively upon any one of the three types of sensors operating alone and independent of the remaining two sensors employed in the overall sensor system.

BRIEF DESCRIPTION OF THE DRAWINGS

FIG. 2-1 is a sectional view of the sun sensor optical head illustrated by FIG. 2, in accordance with the present invention;

FIG. 2A-1 is an alternative embodiment of a sun sensor optical head, and FIG. 2A-2 is a sectional view of the sun sensor optical head illustrated by FIG. 2A-1, in accordance with the present invention;

FIG. 5A illustrates an elevational view in section of a Polaris star sensor, and FIG. 5B is a front sectional view of a detector element of the Polaris star sensor, in accordance with the present invention;

FIG. 7A illustrates a single axis static earth sensor for geosynchronous orbit including two Reststrahlen reflective filters, and FILTER 7B illustrates the position of the filters in the earth sensor, in accordance with the present invention;

DESCRIPTION OF THE BEST MODES FOR CARRYING OUT THE INVENTION

The basic concept underlying the three axis system in accordance with the present invention is that three sensors cooperate with each other, with each sensor using its strengths to overcome the inherent weaknesses of the other two sensors, and depending upon the other two sensors, to overcome its own inherent weaknesses. The combination of sensor parameters results in a highly accurate three axis readout, which could not be achieved by any of the three sensors acting alone, and is accomplished by software in either the spacecraft computer, or a special, low cost, majority voting logic microcomputer provided in a "stand-alone" system.

The performance and physical specifications for this three axis sensor system in accordance with the preferred embodiment of the invention is as follows: Weight for complete system, <1.0 Kg., if the spacecraft computer is used to perform the attitude readout, and <1.5 Kg. if a self-contained computer is provided. Accuracy of location of earth local vertical in three axes ±0.5° 3 sigma. Power consumption of complete system <1.0 watt without computer, <2.0 watts with computer. Angular readout capability while maintaining accuracy: ±6.0° along the earth equator, (Pitch), ±3.0° along the earth pole (Roll), ±3° in Yaw (around the earth local vertical).

The system in accordance with the preferred embodiments of the invention is composed of:

A Two Axis Sun Sensor with an 80° Diameter Field Of View and a Readout Accuracy of ±0.05°; A Two Axis Polaris Star Tracker with a 12° Diameter Field Of View and a ±0.05° Readout Accuracy; and An Infrared Single Axis Earth Sensor (For Use When the Sun is Behind the Earth) with a Readout Holding Accuracy of ±0.05°. The volume and weight of each sun sensor optical head is <2.0 cu. inches, and 13 grams, respectively. The volume and weight of the Polaris sensor is: <70 cu. inches, and 0.6 Kg. respectively. The volume and weight of the earth sensor is: <1.0 cu. inch, and 10 grams, respectively.

Figure 1:
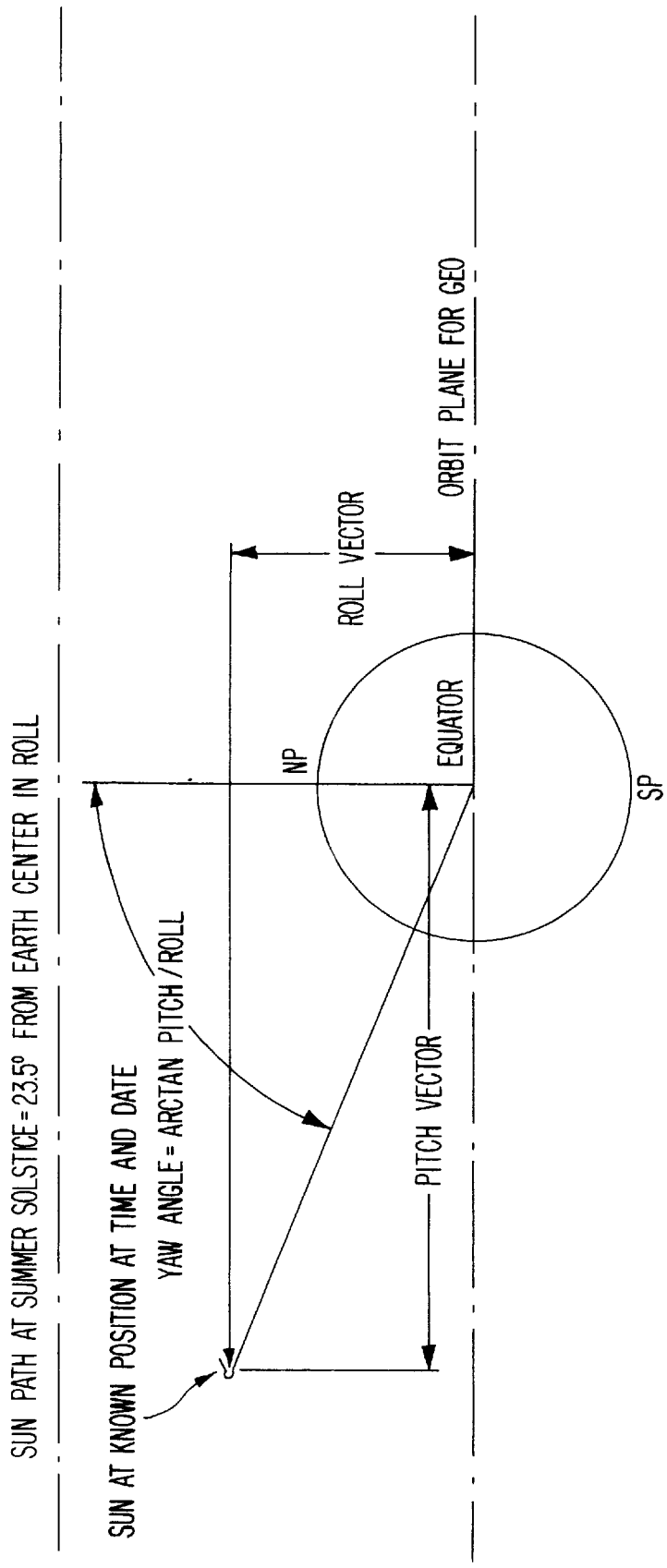
FIG. 1 is a schematic drawing illustrating pitch, roll, and yaw of earth center derivation from sun position, time and date.

In order to operate successfully in a geosynchronous orbit, it is mandatory that the exact position of the spacecraft be continuously maintained over a predesignated, certain point on the earth, which is its allocated "slot". Through the use of an absolute clock, the spacecraft then knows precisely the location of the sun relative to the earth local vertical once it is in its proper station. With this knowledge, as well as a knowledge of the exact date in the year at four zones throughout the 24 hour orbit period, a two axis sun sensor (described later herein in greater detail) can provide three axis attitude information relative to the earth local vertical, as is shown in FIG. 1. At the Spring and Fall Equinoxes, when the sun is aligned with the spacecraft roll axis (9:00 A.M. and 3:00 P.M. local time), the sun sensor cannot read out the roll attitude. Even at times of the year other then the Equinoxes, the Roll sensitivity degrades markedly, so that near these local times the sun sensor cannot read out the roll attitude. The same is true for the Yaw readout of the sun sensor when the sun is at 12:00 noon. When the sun is behind the earth (±21 days about Spring and Fall Equinoxes) the sun sensor cannot be used, and other sensors must take over the attitude readout function.

The Polaris star sensor (described later herein in greater detail) is a very simple sensor, unlike most star trackers, because it is based upon the operating concept of the sun sensor, and uses the same detector and signal processing. Moreover, since the Polaris recognition and acquisition is accomplished for the Polaris star sensor by the sun sensor, the complexity applicable to these parameters in other star trackers is inherently eliminated. The only star ever tracked by this star sensor is Polaris. Since there is no significant star approaching the brightness of Polaris within ±6°, the readout of Polaris is handled identically to that of the sun, and its absolute brightness is not considered in the readout computation. The acquisition sequence operates for any condition when the sun is seen, within ±5° of the "uncertainty zones" (i.e., the 4 zones referred to above). In these zones, sun sensor output and the spacecraft clock are used to determine the spacecraft attitude in three axes. The spacecraft is made to slew in pitch, roll, and yaw until it is at nominal null in these three axes. It is emphasized that even when the sun is as close as ±5.0° to the "uncertainty zone", the image of Polaris will still be brought to within ±0.5° of nominal in this acquisition mode, and will thus be acquired by the Polaris star sensor.

Once Polaris is acquired, the system can operate to within its specified ±0.05° accuracy for the >94% of the orbit that the sun is not behind the earth. During this sun-visible period the IR earth sensor (described later herein in greater detail) is concurrently reading out the Pitch attitude of the earth. The thermal and earth radiance errors of the IR earth sensor are calibrated out based upon the highly accurate Pitch outputs of the sun and/or the Polaris sensors. Therefore, when the sun is behind the earth for a maximum period of 1 hour, 10 minutes at the Equinoxes, the pitch attitude of the spacecraft is held by the earth sensor, and roll and yaw is provided by the Polaris sensor. Because the IR earth sensor must hold its accuracy and minimize thermal offsets for a maximum time period of only 1 hour, 10 minutes, this greatly simplifies the earth sensor design parameters and test requirements. All long term thermal stability requirements normally applicable to IR radiance balance earth sensors can be disregarded, and the radiance patterns on the earth, which are dependent on season and/or cloud patterns, can be disregarded because of the short time interval. In addition to reducing the time/temperature stability requirements for the earth sensor components, the test requirements for the IR earth sensor are greatly simplified, thus greatly reducing its cost. With regard to the possibility that the earth sensor might introduce additional error if it were required to move the spacecraft to a different pitch offset during the maximum 1 hour 10 minute sun occultation period, it is noted that: a). Any potential error is proportional to the pitch offset that the IR sensor must hold (±6° maximum). At null, the radiance error is minimized due to its tangent field configuration, which prevents the earth sensor from seeing any radiance patterns on the earth; b). The local time at the subsatellite point applicable to the sun occultation condition is always near 12:00 midnight, so that a change in pointing of the spacecraft pitch attitude would be unlikely; and c). Any error that might be introduced is proportional only to the degradation in linearity of the sensor output transfer function, since the errors applicable to the absolute offset of the "held" pitch attitude are greatly minimized by the calibration during the sun-visible portion of the orbit. Therefore, these errors would be second order.

FIG. 1 of the drawing is a vector diagram showing pitch, roll, and yaw of earth center derivation from sun position, time, and date. In all cases, the outputs of the three sensors are high level, buffered, analog voltages, insensitive to pickup in the cabling to the centrally located sampler and A/D converter, which then transmits it to the spacecraft computer, or alternatively to the central processor provided. In extremely noisy conditions, it is possible to incorporate a sampler and an A/D converter chip in each optical head at a slight weight and power penalty.

The sampler and A/D converter converts the outputs of all of the sensor's outputs into digital numbers at a 10 msec. rate, and transmits them to the computer, which implements the overall system calculations and computations, as well as the calibration tables associated with the calibration and offset corrections applicable to each sensor (as discussed in greater detail below). The computer then generates the pitch, roll, and yaw readout angle outputs for the spacecraft attitude stabilization system.

Figures 1, 2:
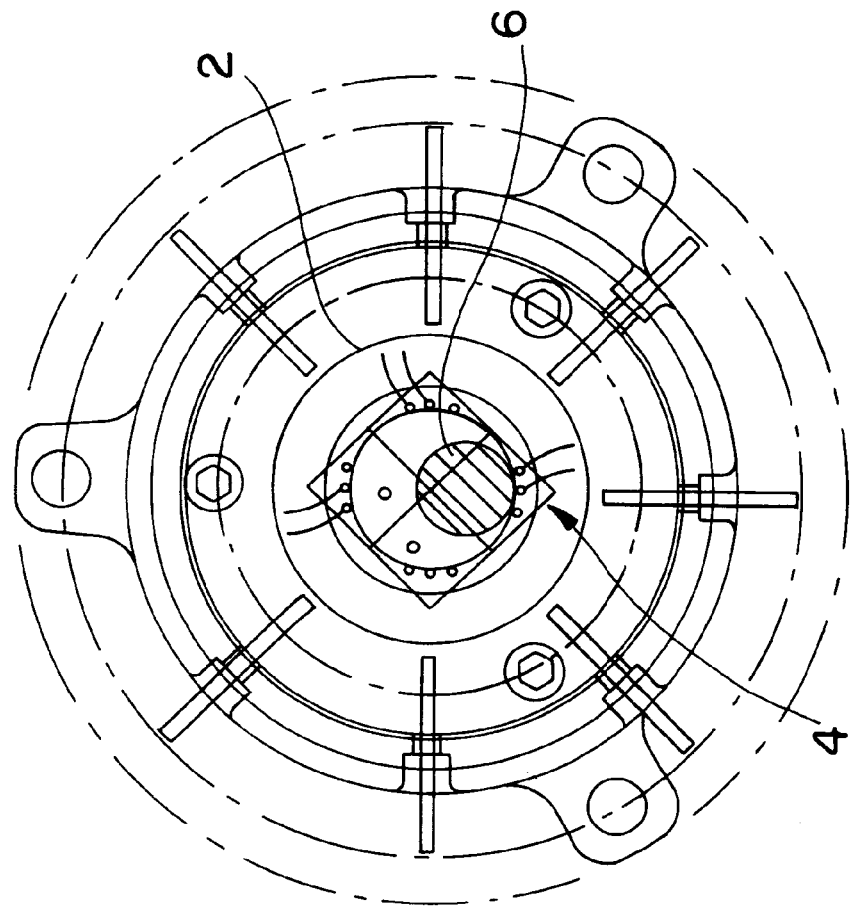
FIG. 2 illustrates a first embodiment of a sun sensor optical head.
Figure 2:
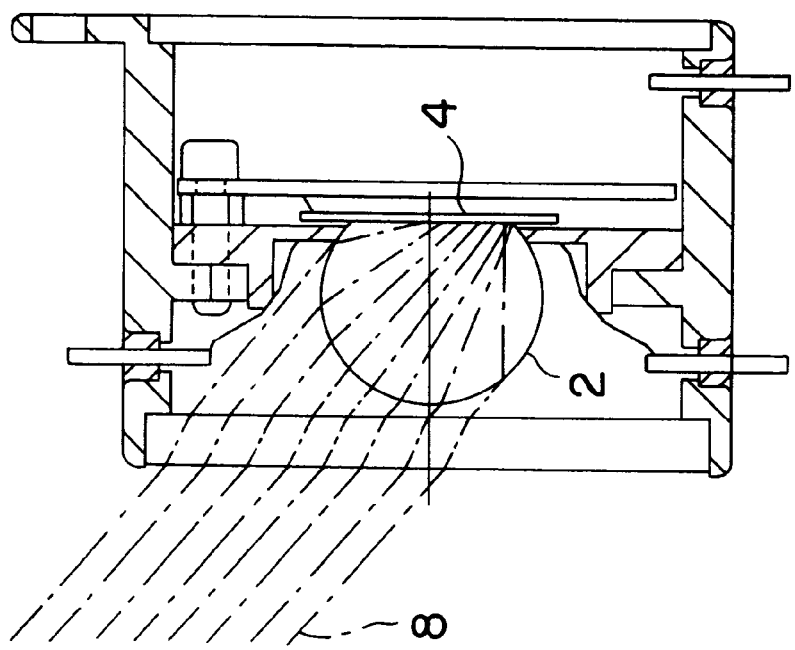

The optical head of the sun sensor is shown in FIG. 2. It is composed of a hyperhemispheric UV grade, fused silica or equivalent lens 2, onto which a quad silicon detector 4 is optically immersed. As can be seen in the raytrace, the aperture stop is limited by the diameter of the hyperhemisphere for tangent rays. This design parameter, eliminates the Lambert Law cosine falloff of energy falling on the detector vs. angular offset angle from the optical axis that would exist for slits or other linear apertures. In this way, the spot 6 on the quad detector shown in FIG. 2 contains all irradiance received from the sun independent of the sun offset angle. Since the UV transmissive epoxy used for the immersion has an equal or higher index of refraction than the fused silica, essentially all rays 8 reaching the detector immersion plane are transmitted to the detector. Therefore, the output transfer function for sun angle offsets are directly proportional to the ratio of the spot area in opposite detector quadrants. This transfer function is substantially linear with offset angle without any linearization. However, during sensor calibration with a sun simulator the sensor output is exactly linearized in a look-up table set in a 1.00° two-dimensional grid, based upon a sun input angle generated by mounting the sensor on a precision, motorized, two-axis angular table with ±0.01° digital angular readouts. The calculation interpolates between these 1.00° grid lines to result in the final sensor—readout. The look-up table also calibrates out any non-uniformities in the quad silicon detector and/or the hyperhemisphere, and reduces these errors by more than an order of magnitude to error changes between sun input angular changes of 1.00°.

Since the silicon detector is immersed on the hyperhemisphere, which has a very low coefficient of thermal expansion, and a low index of refraction change vs. temperature, the effect on angular offset vs. ambient temperature is greatly minimized. For extreme temperature fluctuations, it is entirely practical to thermostat the entire optical head because of its extremely small volume and mass.

In view of the above, the only error remaining is the long term variation in the responsivities of the opposite sectors of the quad silicon detector. This is addressed by incorporating an automatic calibration device using a LED chip mounted in the center of the hyperhemispheric lens so that it equally illuminates all four sectors. The LED is a radiation hardened unit which, for example, can be obtained from OPTO-DIODE Inc.. It operates at 810 nm., and has been tested to show minimum degradation after irradiation with a fluence of $10^{12}$ neutrons/cm$^2$.

It is emphasized that silicon detectors are extremely stable devices, and have been used as primary optical radiation standards at NIST, so it is unlikely that any significant responsivity changes will occur. However, in order to achieve the specified accuracy of ±0.05° at the extreme 40° offset angle, the responsivity ratio of opposite quadrants must be held stable to ±0.1%, or 1 part per 1,000.

The LED is modulated with a 10 Hz. or higher square wave at a very high derating factor (<1% of rated drive) allowed by the high sensitivity of the silicon detector. The LED chip is immersed on to the hyperhemisphere so as to positively protect its emitting surface from contamination that might affect its beam uniformity. With a sampling rate period of 10 msec., the modulated silicon detector signal superimposed upon the dc. signal proportional to the sun offset can be fully digitized with negligible distortion. The peak to peak ac signal generated by the LED is then demodulated in the calculations, and becomes the measure of the real time responsivity of the combination of the silicon detector sector and its preamp. The ratio of signals seen in opposite quadrants then becomes the sun offset angle, and is compared to the calibrated ratio stored in the look-up table. The use of the ratio of these signals also eliminates the error effect of any absolute radiance output of the LED vs. age and/or ionizing radiation, and/or the absolute responsivity/gain in each channel.

Recent measurements on silicon cells indicate that there might be a degradation of the uniformity of silicon cells over long term exposure to Van Allen ionizing radiation in space. Such a change would not be compensated for by the LED inflight calibration. If this should become a problem, the configuration shown in FIG. 2A eliminates the errors resulting from such a potential problem. In this configuration, the immersion lens is replaced with an integrating sphere, 10 whose interior surfaces are coated with a white paint having very high diffuse reluctance. The four quadrants are then generated by two plane baffles 12 also coated with this white paint. Using an aperture stop coated on the entrance window, the incoming solar rays are divided into four quadrants exactly analagous to the technique previously described with respect to FIG. 2. However, instead of a quadrant silicon detector, the offset angular signals are generated by four small silicon cells 14, whose response uniformity is irrelevant to the generation of the offset transfer function. In this approach, there is a small cosine falloff vs. offset angle, but this is compensated for and linearized in the sensor calibration. All other sensor functions are identical to that of the configuration shown in FIG. 2 and previously discussed with respect to FIG. 2.

In system operation, six optical head are mounted 60° apart on the spacecraft in the orbit plane so as to provide sufficient overlap that the 80° diameter fields provide all-season coverage for the sun throughout the orbit plus some roll and/or yaw offset. The overlap also provides an additional check on the LED calibration, since in these overlap zones the sun will be read out by two adjacent sensors, whose outputs should match. As each sensor sees the sun, its adjacent head is sampled by the sampler/digitizer module, and it is processed with the sun readout calculation.

A final design feature of this sun sensor is the earth albedo error minimization. As is shown by the following calculation, at geosynchronous altitude, the 17.45° earth subtense albedo in the 0.3 to 1.0 micrometer wavelength region does not add significant error to this analog sensor. However, if the sensor is used at low earth orbit (LEO) the 0.4 to 1.0 micrometer albedo reflectance factor would cause a significant error. This error is made negligible through the use of the "solar blind" 0.25–0.32 micrometer wavelength region for the sensor's spectral operating region. In this region, essentially all ultraviolet (UV) sunlight is prevented from reaching the earth surface by the ozone layer at >100,000 ft., which absorbs UV heavily in this region. Using the basic optical relationship:

1.0=TRANSMITTANCE+REFLECTANCE+ABSORPTANCE, in the ozone absorbing region, since ozone has essentially zero reflectance, and its absorptance is nearly 1.0, negligible reflectance can come from the earth or clouds so that the earth solar reflectance (albedo) approaches zero. The present analysis, conservatively assumes an albedo of 0.01 in the sensor operating region of 0.25 micrometers and 0.32 micrometers.

Figure 3:
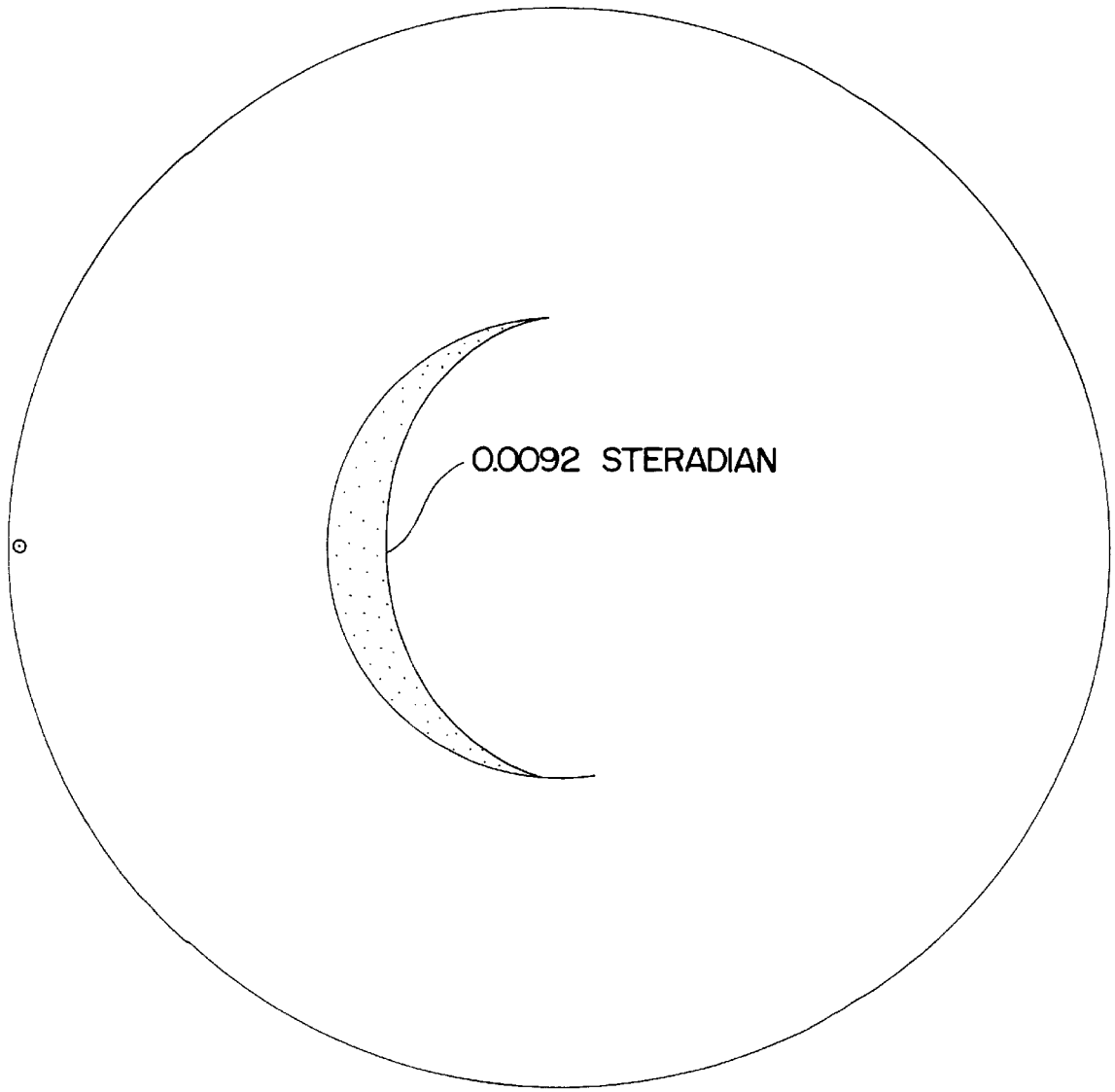
FIG. 3 illustrates a geogynchronous earth albedo crescent for sun at the edge of 80° diameter field.

As can be seen in FIG. 3, for the worst case of a sun 40° off axis in the sensor head whose field includes the 17.45° geosynchronous earth, the resulting earth albedo assumes a crescent with a 40° equatorial indentation. The solid angle subtended by this crescent is 0.0092 steradian.

The radiance generated by an unrealistically conservative assumed albedo of 1.0 (assuming complete cloud cover, pole to pole) is determined by: earth irradiance at the sensor=0.1 w/cm$^2$×1.0×0.0092 ster/pi ster=2.92×10$^{-4}$ watts/cm$^2$.

This earth radiance is equivalent to 0.292% of the sun's direct irradiance at the sensor. At this 40° off-axis angle essentially all of the sun's irradiance falls on one silicon detector quadrant, while, in the worst case sensor position approximately 30% of the albedo irradiance is asymmetrically distributed on the opposite quadrant that the resulting error would be 0.04°. For the nominal earth albedo of 0.4 the error reduces to 0.016°. Both of these values are within the specified 0.05° sensor accuracy. However, the albedo is reduced to 0.01 by using the UV wavelength region, and the error becomes 0.0004°, which is negligible.

Figure 4:
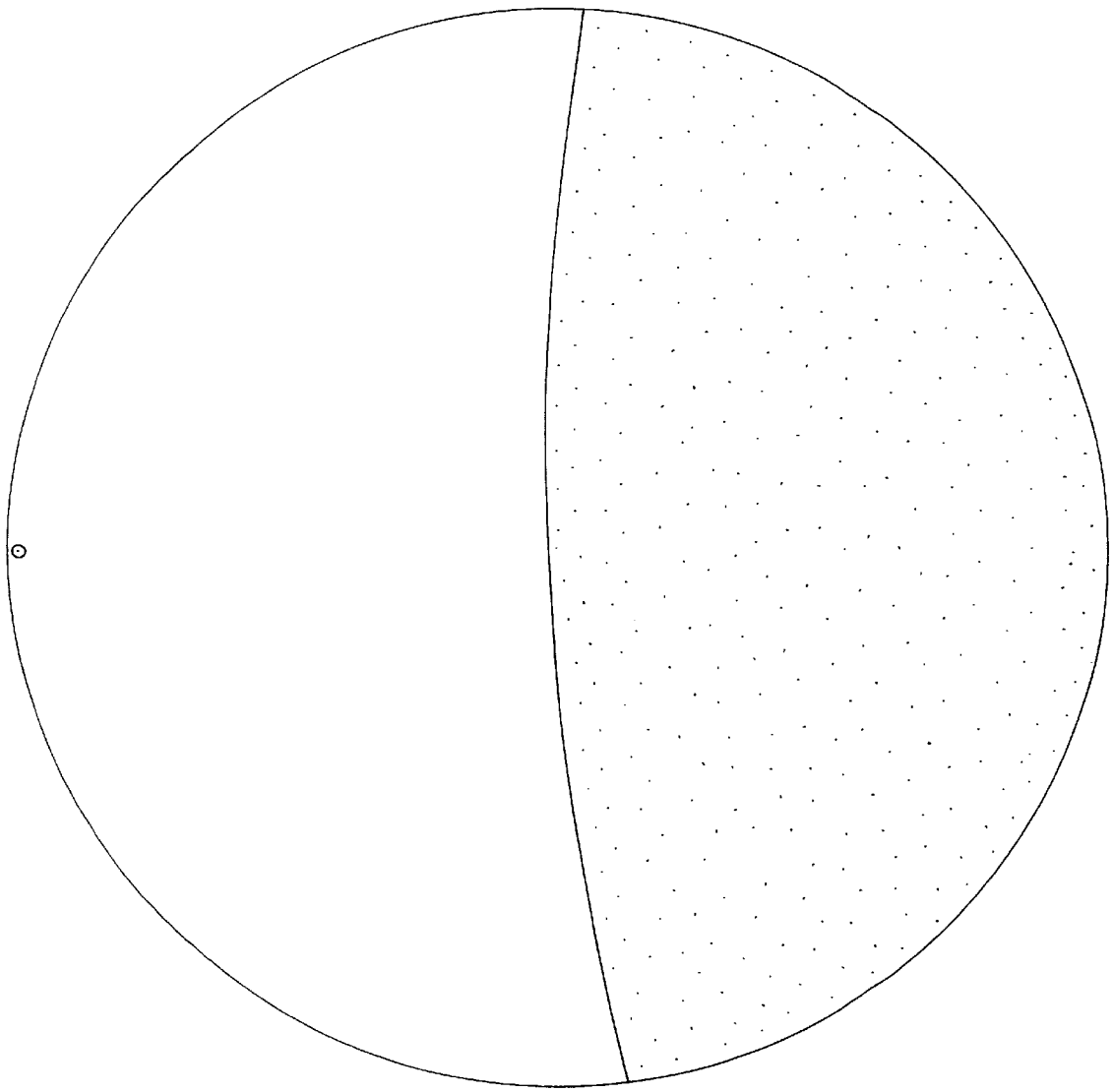
FIG. 4 illustrates worst case low altitude albedo subtense with sun 40° off axis in the 80° diameter field.

At LEO (low earth orbit), the earth steradian subtense as shown in FIG. 4 is 0.65 steradian. At this 40° off-axis angle essentially all of the sun's irradiance falls on one silicon detector quadrant, while, in the worst case sensor position approximately 30% of the albedo irradiance is asymmetrically distributed on the opposite quadrant, and with a realistic albedo of 0.4, the error becomes 1.0°, which is unacceptable. However by using the UV albedo of 0.01, the albedo error at LEO reduces to 0.025°, which is within the specified sun sensor accuracy.

The optical head of a Polaris star sensor is illustrated by FIG. 5 An immersed quad silicon detector 9 is disposed between a primary ellipsoidal mirror 11 and a secondary spherical mirror 13. An autocollimation mirror surface 15 defines the rear surface of the primary mirror 11. As can be seen, the star tracking detector is identical to that of the sun sensor, with the exception that since the earth albedo is never seen by the Polaris sensor, the UV filter and neutral density attenuator is not needed, and is replaced with an objective lens and a field lens.

The 5.9 inch diameter aperture Dall Kirkham reflective optical system, collects the 3×10$^{-3}$ watt/cm$^2$ irradiance from Polaris, which is a +2.2 visible magnitude star. With a throughput efficiency of 95%, the objective lens system focuses the star image on a field lens, which accepts a ±3° diameter field of view. The field lens, in turn, directs the energy on to the hyperhemisphere lens on to which the quad silicon detector is immersed, as in the sun sensor.

Since the Polaris star sensor is always at least 60° away from the sun in the worst case of the summer Solstice, no significant optical baffling is required, as compared to the extensive baffling normally required for conventional star trackers, thus greatly reducing the weight and volume of this star sensor.

The point source image of the star focused at the field lens is then converted into a circular spot similar to that of the sun in the sun sensor, and the identical signal processing hardware and software is used to read out the position of Polaris in the Star Sensor field based upon the percentage of the circular spot that is seen by each of the four elements in the quad detector. As in the sun sensor, any fixed pattern errors are removed by the look-up table stored in the computer memory and any drift in the relative responsivity of the quad silicon detector or its preamps are continually calibrated out by the modulated LED, which continually illuminates all four cells in the quad detector. It is emphasized that unlike other star trackers, the quality of the star image on the objective lens focal plane has negligible effect on the performance of this star sensor, because the image is purposely smeared into a large spot on the quad detector, and any optical aberration effects are neutralized by the calibration look-up table generated for each sensor. Finally, since Polaris is the only star that this sensor will ever see because its field boresight axis is brought to within ±0.5° of Polaris during acquisition by the sun sensor, no absolute irradiance calculation is needed, and there is no star of any significant brightness within the ±3° diameter field of view in the vicinity of Polaris.

The signal-to-noise ratio for Polaris is calculated as follows:

Total Radiant Power on the Quad Detector=$3 \times 10^{-13}$ watt/$cm^2 \times 224.6$ $cm^2 \times 0.84 = 5.66 \times 10^{-11}$ watt.

In a 10 Hz output bandwidth, the specified Noise Equivalent Power for the Advanced Photonix Quad Cell is: $1.5 \times 10^{-13}$ watt. At null attitude each quadrant of the detector receives $1.4 \times 10^{-11}$ watt. Therefore, the Signal/rms Noise for each element in the Quad detector is 94.3/1.

At null, because of the "push-pull" nature of the transfer function, the signal change seen for a 0.1° angular change in the Polaris position is generated by a $2 \times 0.0333 \times 1.4 \times 10^{-11}$ watt change in signal which equals $9.3 \times 10^{-13}$ watt.

The Noise Equivalent angle at null is then given by:

Noise Equivalent Angle (null)=$(0.1° \times 1.5 \times 10^{-13})/(9.3 \times 10^{-13}) \times (2)^{1/2} = \pm 0.0114°$ rms, where the $(2)^{1/2}$ factor appears because the noises of two detectors are averaged to obtain the offset signal. When the sun is seen (>94% of the orbit) this noise can be further reduced by averaging in the appropriate portions of the three axis readouts of the sun sensor.

The output of the single axis earth sensor needs to be employed only during the infrequent occultations of the sun behind the earth, which occur only near the Spring and Fall Equinoxes. The optical configuration of the Single Axis IR earth sensor is shown in FIG. 7. As illustrated, it is composed of two multijunction evaporated thermopiles 16 whose active areas subtend 6°×6° fields bracketing the 17.45° earth image focused on them by a single element germanium lens.

Two folding mirrors fabricated from Lithium Fluoride, fold the beam to make the optical head extremely compact, thus saving structure and weight. However, these two mirrors also provide the spectral bandpass for the sensor without requiring an expensive and increasingly difficult to obtain 14–16 micrometer bandpass filter, which most IR earth sensor use to minimize radiance errors, and reduce the signal level of the sun when it enters the sensor's field of view.

Figure 6:
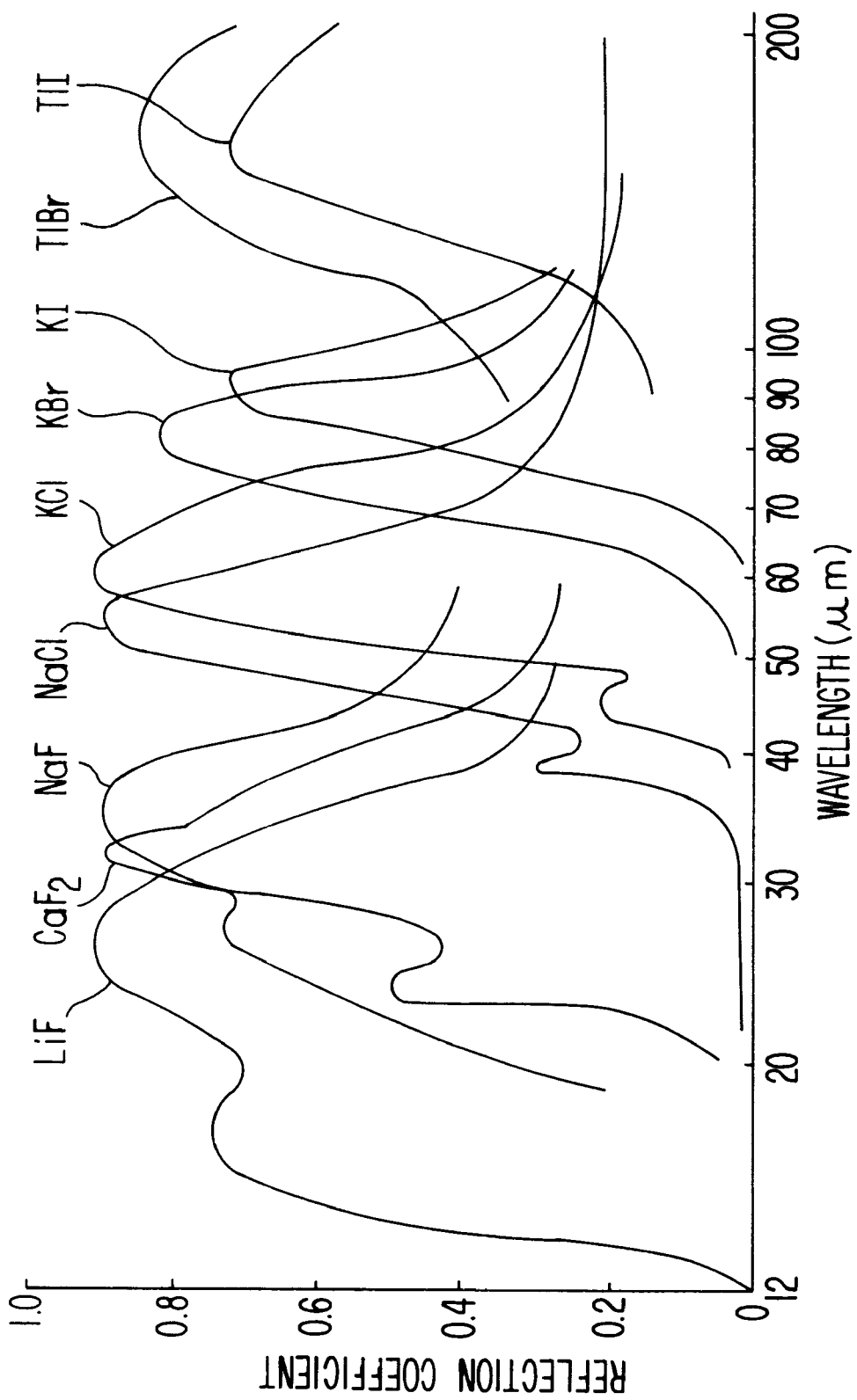
FIG. 6 is a graph illustrating Reststrahlen spectral reflectance response of polar crystals.

The bandpass for the earth sensor is 14–30 micrometers. The 14 micrometer cut-on is achieved by the dual reststrahlen reflective Lithium Fluoride element 18, each of which has a natural high reflectance cut-on at 14 micrometers with a 2% Fresnel reflectance at wavelenths shorter than 14 micrometers (see FIG. 6). By using two of these reststrahlen filters in series, the short wavelength leakage is reduced to 0.04%, which is better than the performance of typical 14–16 micrometer bandpass filters. Furthermore, in addition to providing significant-cost savings, the uniformity and the maintenance of the bandpass is greatly improved for this approach. The rear surfaces of these Lithium Fluoride elements are painted black, and if heated, they can be used as offset radiation sources to minimize the d.c. offsets of the active junctions of the thermopiles in the unlikely event that this should become necessary.

As can be seen in FIG. 7, the fields are tangent to the earth image for a geosynchronous earth. This approach has been used for over 30 years in all IR static earth sensors used in geosynchronous and other highly circular orbits to greatly minimize earth radiance errors at null. This result is achieved because the fields never see the earth radiance at null, and are therefore not subject changes in the earth radiance. It is emphasized that with this field arrangement, the spectral bandpass becomes an irrelevant contributor to sensor accuracy at null with the exception of the condition where the sun enters the sensor's field, in which case it is desirable to have the longest wavelength cut-on possible to maximize the ratio of earth signal to sun signal. In this regard, the 14–30 micrometer bandpass of the sensor provides essentially identical sun rejection. As is discussed herein, the earth sensor is used only when the sun is occulted by the earth, which occurs for a maximum of 1.15 hours in the 24 hour geosynchronous orbit, and ±21 days around the Spring and Fall Equinoxes. If the spacecraft is maintained about null in Pitch, then the earth radiance is never seen by the earth sensor fields, and no earth radiance error can occur. At wavelengths >14 micrometers, the sun produces a signal approximately 2.8 times that of a 6°×6° field fully filled with a 230K earth. Therefore, if the sun is seen in an earth sensor field (just before it is occulted by the earth), and the earth sensor receives so correction from the sun sensor or from the overall system algorithm, a saturated earth sensor signal, indicating a 6° pitch offset error would result. However, this can never occur because if the sun is visible it is seen by the sun sensor, which provides all three axes of attitude readout, so the earth sensor's pitch output is not used.

The critical condition occurs for two, 2 minute time periods as the sun sets into the earth or rises from behind the earth. When the sun skirts the earth poles 4 times a year, these two periods can increase in duration to a maximum of 6 minutes, but these longer times have no effect on the earth sensor or overall system errors, because the sun at these high elevation (roll) offsets is not seen in the two earth sensor fields. Therefore, only these 2 minute periods need to be addressed as follows.

There are only two pitch offset attitude conditions in which the setting or rising sun could conceivably cause significant pitch errors. This is true because if the spacecraft is at pitch null, both IR fields are tangent to the earth image with a light angular indentation. In this case, if one field is contaminated by the sun, the opposite field is reading the correct earth indentation, which has been calibrated by cross-checking with the sun sensor pitch output for the previous 23 hours of the orbit. Therefore the pitch attitude can be successfully held by the field which is not sun contaminated. This is true for both the setting and rising sun cases for the spacecraft pitch attitude at null (±0.1°).

The two cases of concern apply when there is a significant pitch offset that must be held by the earth sensor (i.e. ±0.5° to ±6°) In these cases, the earth sensor field that is dipped into the earth is susceptible to significant sun errors because it cannot be corrected by the opposite field, which is located far form the earth horizon and viewing all space. There are two possible means of passing through these two minute periods with negligible additional errors introduced:

1. The on-board gyros can hold the pitch attitude accurately determined before sunset or sunrise and maintain the pitch rate relative to inertial space, before handing the pitch attitude readout function to the earth sensor for the duration of the sun occultation.
2. The earth sensor fields can be split into two sets of two, 3°×6° fields, separated in the roll plane by 1.0°, thereby preventing the sun from contaminating any pair of fields. The choice of which pair of fields to be used would be made by the calculation based upon season.

Figure 8:
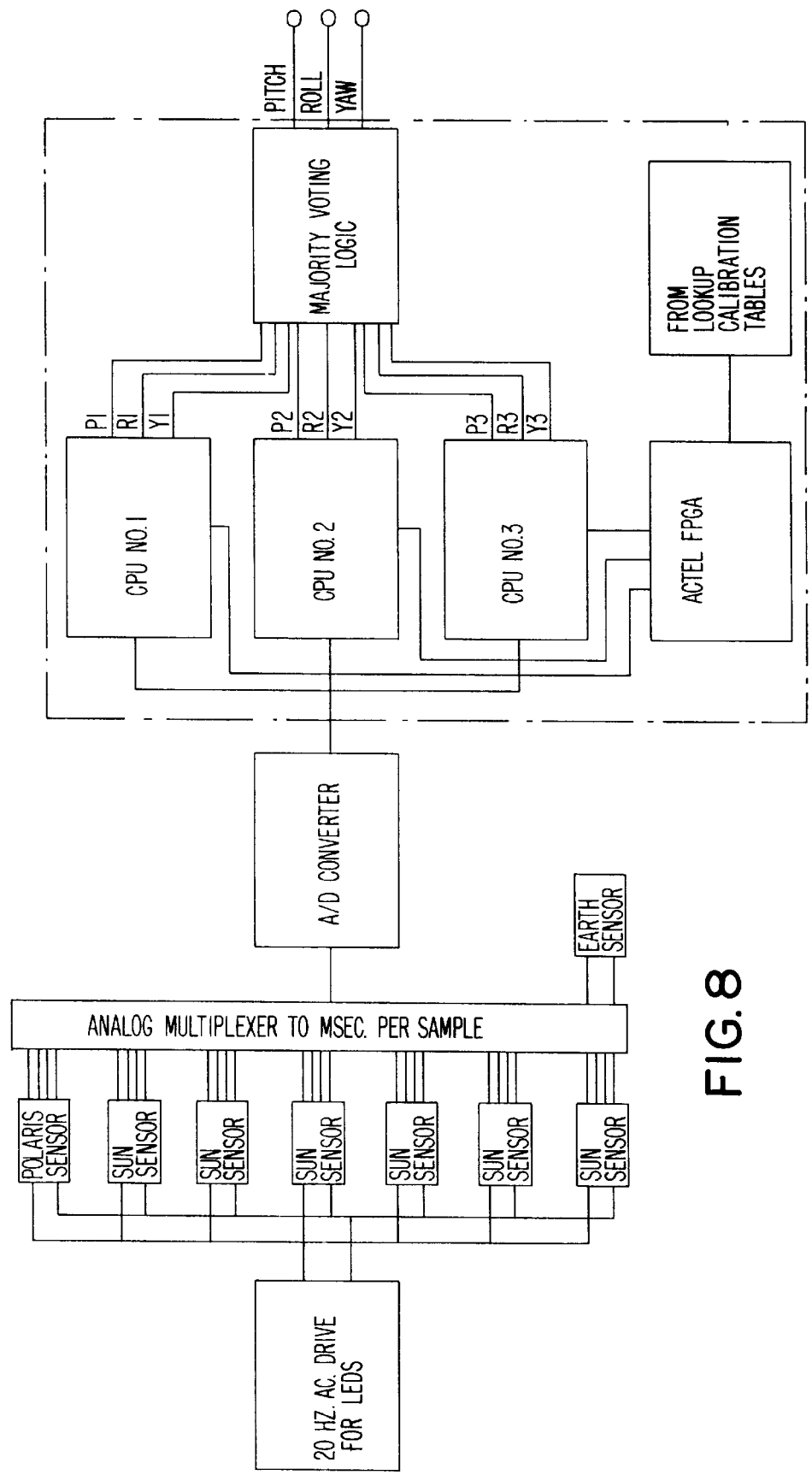
FIG. 8 illustrates a schematic configuration for a microcomputer useful in connection with the present invention (or the interface with the spacecraft computer)

A configuration of a micro-computer that would be provided if the spacecraft computer cannot be used to process the sensor signals is shown in FIG. 8.

The use of three CPU's in majority voting logic configuration is dictated by economic considerations. This function can, in the alternative, be accomplished by a single CPU, in conjunction with the FPGA and the PROM's. However, radiation-hard, Single Event Upset (SEU)-resistant CPU's are quite expensive in comparison other CPU's which do not have this radiation resistant feature, generally by a cost ratio of 10/1.

A Single Event Upset in the three CPU configuration illustrated by FIG. 8 should affect only one of the CPU's, so that the three CPU configuration can be considered to be SEU-resistant at one third the cost. In addition, the Multiple CPU's also provide reliability redundancy as an added advantage.

A trade-off exists in regard to the quantity of PROM's required vs. temperature control of the sun sensor module. Because the silicon detector responsivity constancy must be maintained to ±0.1%, if the quad silicon cell must operate over a −30° C. to +70° C. temperature range additional "look-up" tables at incremental temperatures may be required. These look-up tables must be stored in PROMS to allow for any change in responsivity matching vs. ambient temperature. Conversely, by using a simple, single stage thermoelectric heater/cooler on the hyperhemisphere lens/quad detector assembly for maintaining it at 25° C., a single look-up table will suffice, and the environmental temperature test will also be made simpler, thus saving further costs. Because of the relatively small volume of the sun sensor, a maximum expenditure of 1.0 watt per sensor head in the unlikely event that the sensor head sees and ambient temperature at the extremes of the temperature range would be the power cost for this option. If the passive thermal control of the sensor maintained it near 25° C., this additional power consumption would approach zero watts.

In an alternative configuration of the invention in which the sun sensor is mounted on a sun-tracking solar panel in GEO orbit, only one sun sensor is required, since it is mounted on the solar panel, which tracks the sun in at least one axis (pitch). In this case, the field of view can be decreased to ±30° conical, which will allow coverage of the sun elevation angle of ±23.5° for all seasons, without solar panel roll tracking. This allows an improvement in accuracy by ¾ to ±0.035° about roll, assuming the same error sources as described above. Because the solar panel tracks the sun about pitch, the sun is maintained near the sun sensor null, so that the sun sensor pitch errors, which are proportional to the sun offset from null, will be reduced to <±0.01°. If the solar panel tracks the sun about both pitch and roll, then the sun sensor field can be reduced even further up to a limit in which sun acquisition may become difficult. In any case based upon the above discussion for pitch tracking for the dual axis tracking solar panel, the sun error in both pitch and roll will be <±0.01°.

In a further alternative configuration in which the sun sensor is mounted on a sun-tracking solar panel in LEO (low earth orbit), it is assumed that the solar panel is tracking the sun about two axes, so that the ±30° or ±40° conical field applies and the ±0.01° accuracy near null would apply. In this further alternative embodiment, the Polaris Sensor is also mounted on the solar panel so that its null axis is oriented 90° to the null axis of the sun sensor in a plane parallel to the earth's pole axis. Assuming that the solar panels pitch tracking axis is normal to the orbit plane, the Polaris sensor would be mounted on the northernmost edge of the solar panel so that it has an unobstructed view of Polaris when the sun is at the Spring and Fall Equinoxes.

Figure 9:
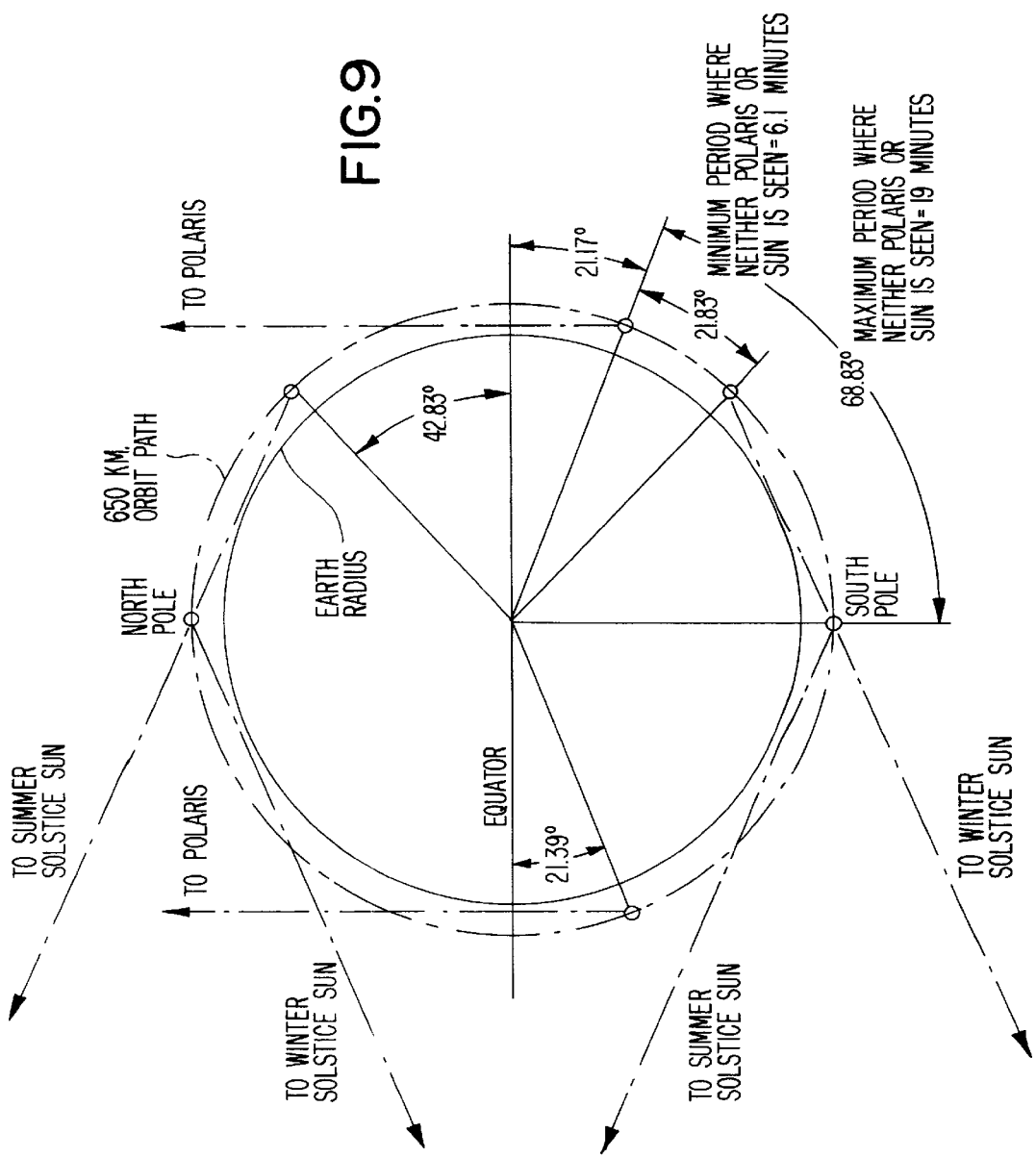
FIG. 9 illustrates orbit geometry for a 650 KM polar orbit (worst case)

When the sun is occulted by the earth at the Equinox points shown in FIG. 9, there would be only minimal two-axis angular adjustment required for the solar panel in order to switch three-axis attitude control from the sun to Polaris. At other times of the year, for orbit inclinations of <22°, where Polaris is always seen for LEO altitudes >650 Km., the solar panel would be slewed by up to 23.5° in the earth's polar plane, and any required smaller amount along the earth's equatorial plane in order to acquire Polaris.

If this cannot be accomplished in a short enough time period so that the inertia of the spacecraft, combined with its residual random attitude error drift causes it to drift from the earth local vertical by an unacceptable amount, then a lightweight, low cost, two axis gyro, such as the tactical-missile-air-bearing gyro (marketed under the trademark MINITACT) manufactured by Allied Signal, would be used to stabilize the spacecraft to the earth local vertical for this short term solar panel angular maneuver. These tactical gyros weigh less than 250 grams and, when optimized for the relatively slow rates applicable to spacecraft vs. the extremely high rates applicable to the tactical missile, they typically provide a drift of less than 0.1°/hour, so that for the few seconds of the panel maneuver there would be negligible error in the spacecraft pointing to the local vertical.

For low earth orbits with inclinations greater than 22°, there are periods in the orbit when neither the sun or Polaris can be seen by either sensor. These zones are shown in FIG. 9 for the worst case of a 90° inclination (polar) orbit, other than sun-synchronous in which the orbit plane is parallel to the sun line. All other inclination angles and orbit plane orientations will produce shorter sun/Polaris "blackout" periods. As can be seen, the longest time period occurs at the northern hemisphere summer solstice, and amounts to only 19 minutes, assuming a 100 minute LEO period. There are two methods for dealing with these "blacked out" periods for a two axis attitude sensor system, discussed as follows.

1. The two axis air bearing tactical gyro discussed above can control the two axis attitude for this maximum 19 minute period. If the maximum drift rate of 0.1°/hour applies to this gyro, the worst case attitude error that would result at the winter solstice would be ±0.031°.

2. A two-axis version of the IR earth sensor described above, for LEO (low earth orbit) would include 4 of the optical heads shown in FIG. 7, in which one of the two fields in each head would be oriented so that its edge is tangent to the earth horizon at the nominal LEO altitude. The other field would view all space, and would provide an absolute radiometric reference for the field which just indents the earth horizon. All of the design simplifications discussed for the GEO version of this IR earth sensor also apply to these sensor heads.

For a three axis attitude sensor system at LEO (low earth orbit), two of the two axis tactical gyros are required. This provides three axis attitude maintenance during the blacked out period, with one redundant axis that can serve to reduce the gyro-drift-induced errors.

The testing and calibration of the systems in accordance with the present invention is significant in achieving the system's specified accuracy. The specific testing configuration and plan for the three sensors is described as follows.

Figure 10:
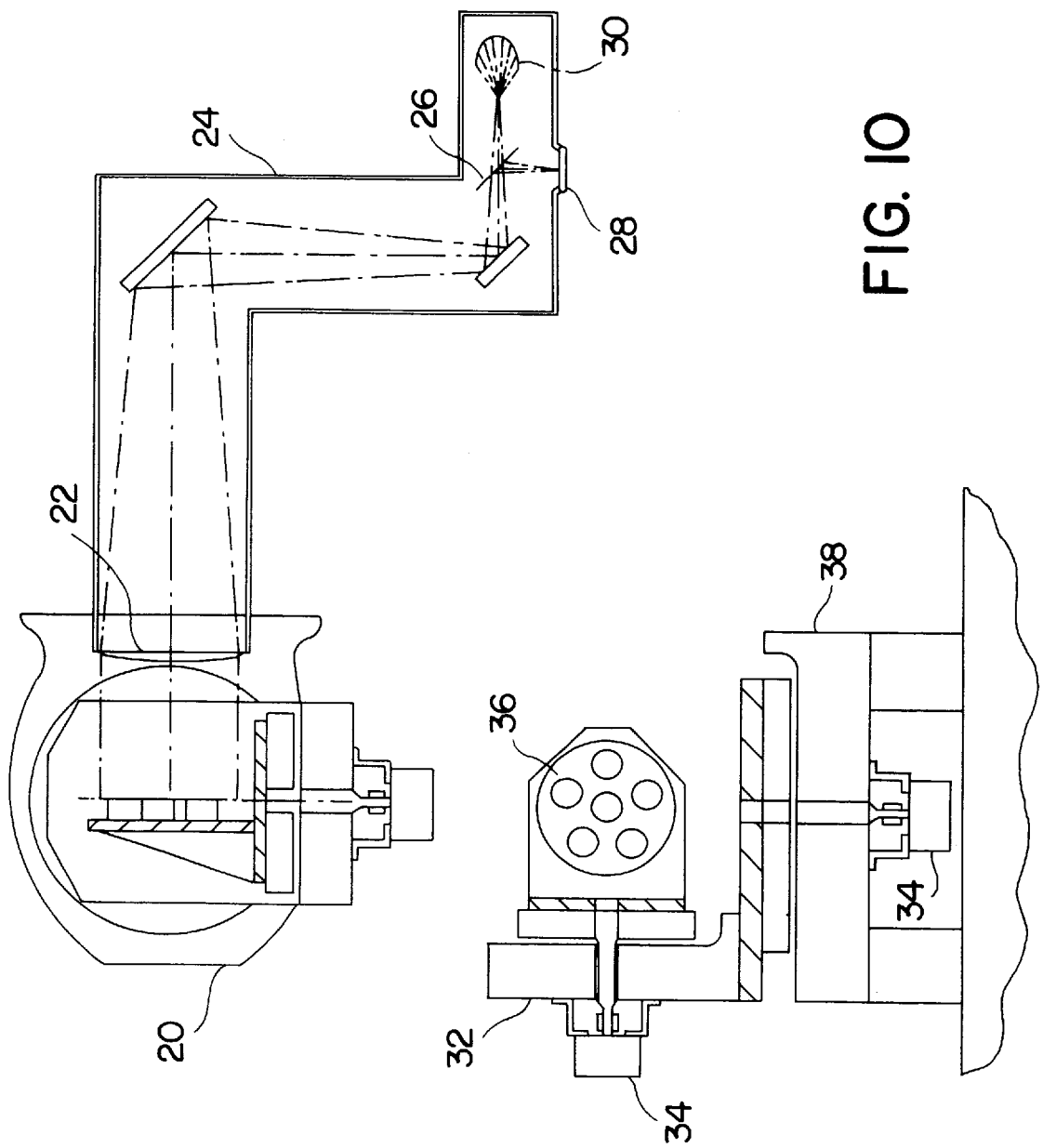
FIG. 10 illustrates an arrangement of a calibration/test set up for a sun sensor in accordance with the present invention.

The sun sensor is tested using a computer controlled motorized two axis rotary table incorporating <5 arc second accuracy digital angular readouts on each axis. A conceptual layout of this two axis table and the associated solar simulator/autocollimator is shown in FIG. 10, FIG. 10 illustrates a calibration/test setup for a sun sensor shipset including a first component having a pitch table 20 rotated ninety degrees, a fused silica collimating lens 22, a sun simulator 24, a removable beam splitter 26, an autocollimation screen 28, and an arc lamp with ellipsoidal mirror sun simulator source 30; and a second component having a motorized (roll) rotary table 32, digital angular encoders 34, a shipset 36 of sun sensors to be tested simultaneously, and a motorized (pitch) rotary table 38. The computer program which drives these tables during the calibration and testing cycle generates a raster angular step pattern in pitch and roll covering the 80° diameter field in 1.0° steps. The sensor is illuminated with a collimated xenon arc lamp with a UV transmissive window providing one solar constant in the sensor's spectral operating region. This solar simulator is calibrated against a NIST secondary radiometric standard. It is emphasized that the solar simulator applicable to this sun sensor has much less constraints than the solar simulators for other sun sensors, which must closely simulate both the solar irradiance and the solar subtense. This is an extremely difficult, if not impossible, requirement to achieve at reasonable costs with xenon arc lamps. However, since the sun is not focused as an image on the sun sensor, the angular subtense of the simulated sun is totally irrelevant to the calibration accuracy of the sensor, and its simulated angular subtense only comes into play at the edges of the 80° diameter field, which can be completely handled by a specification limitation defining a "safety zone" at the field perimeter.

The two axis sensor analog output is digitized and these digital amplitudes are stored in a look-up table stored in a PROM, vs the digital input angles. The calculation interpolates between these look-up table points to achieve the linear readout vs. offset angle and the accuracy. The calculation also accounts for any change in responsivity or gain in each of the four channels in each sun sensor by periodically comparing the LED peak to peak amplitudes of the four signals vs. the calibration values of the LED ac. amplitudes. The calculation adjusts the amplitudes of the four detector signals based upon this in-flight calibration before comparing it to the look-up table values and the interpolation. This calibration will be carried out once over an ambient temperature range during the qualification test to prove the adequacy of the multiple look-up tables vs. temperature, if that trade-off is pursued. Alternatively, a thermal test during the qualification test will check the function of the thermoelectric heater/cooler which maintains the optical head at 25° C. in the presence of an ambient temperature range, to show that this heater/cooler does not impart mechanical angular offsets to the optical head over the temperature range.

The testing and calibration procedure for the Polaris Star Tracker is identical to that for the sun sensor, and uses the same simulator with a pinhole field stop aperture to simulate the angular subtense of Polaris, combined with a neutral density filter to provide the appropriate Polaris irradiance. The only difference in the test and calibration procedure is that the field of view scanned for the calibration is only 6° diameter, and the steps stored in the look-up table are spaced 0.2° or more apart, depending upon the accuracy requirements.

The IR earth sensor is essentially calibrated in space based upon the pitch attitude measured by the sun sensor and the Polaris sensor. These pitch attitudes are transmitted into RAM and compared with the sensor digitized angular readouts for null attitude or off-null attitudes in pitch. It is the purpose of the IR earth sensor only to hold this pitch null of pitch offset for the maximum 1.15 hour of sun occultation by the earth. Therefore, there is no look-up table generated for the IR earth sensor in-ground testing. What is generated is the earth sensor transfer function slope at various pitch angular offsets. This is accomplished without the use of a vacuum chamber (unlike other static earth sensors which require extremely expensive thermal vacuum chambers with $LN_2$ backgrounds).

Since the thermopile detectors have a major change in responsivity between air and vacuum, the IR earth sensor must be calibrated with the thermopile detectors in a hard vacuum. This is accomplished without using a vacuum chamber by attaching a vacuum diffusion pump the a fitting on the sensor optical head and applying a vacuum better than $1 \times 10^{-4}$ Torr. to the interior of the optical head during calibration. A ZnSe collimating lens with a 12" focal length is temporarily attached to the sensor optical aperture to focus its fields on a heated disk subtending 17.45°. The sensor is then mounted on the same two axis motorized table used for calibrating the other sensors.

In a static sensor the true zero K space background must be simulated during calibration. This is achieved by mounting the sensor head so that its optics look into an open mouthed vacuum jacketed dewar filled with liquid nitrogen, just ahead of which is mounted the heated earth simulation disk. The entire assembly including the two axis table, and a 45° first surface flat mirror, is mounted within a polyethylene "tent" which is continually purged by the evaporating liquid nitrogen to eliminate any water vapor which could condense on the cold sensor optics.

Using this test setup, the motorized two axis table exercises the angular offset of the earth sensor for a raster pattern of pitch offsets in the presence of roll offsets to calibrate the transfer function slope for these offsets. These transfer function slopes are stored in a lookup table in a PROM to be used if there is a desire to offset the spacecraft in pitch from its holding position for the maximum 1.15 hour sun occultation period. If it is not decided to temperature control the optical head with a thermoelectric heater/cooler (or resistance heater alone), the sensor can be tested over ambient temperature in this setup using a liquid-temperature-controlled mounting plate to which the sensor is attached while it is mounted on the two axis table.

What is claimed is:

1. A system for three axis attitude readout for a geosynchronous orbiting spacecraft, said system comprising:
   a first sensor comprising a sun sensor;
   a second sensor consisting of a Polaris star tracker;
   a third sensor comprising an earth sensor; control means operatively associated with said first, second and third sensors for selectively actuating at least one of said first, second and third sensors; and
   means operatively associated with said sun sensor and said Polaris star tracker for calibrating said earth sensor for eliminating error from said earth sensor.

2. The system as claimed in claim 1 wherein said earth sensor comprises an objective lens, two LiF restrahlen spectra filters, and at least two thermopile infrared detectors.

3. The system as claimed in claim 1, wherein said first sensor is a two axis sun sensor.

4. The system as claimed in claim 3, wherein said sun sensor has a substantially 80° diameter field of view.

5. The system as claimed in claim 3, wherein said sun sensor has a readout accuracy of at least ±0.05°.

6. The system as claimed in claim 1 wherein said Polaris star tracker is a two axis Polaris star tracker.

7. The system as claimed in claim 6 wherein said Polaris star tracker has a substantially 6° diameter field of view.

8. The system as claimed in claim 6 wherein said Polaris star tracker has an accuracy of ±0.05°.

9. The system as claimed in claim 1 wherein said third sensor is a single axis earth sensor.

10. The system as claimed in claim 6 wherein said control means is adapted to enable said earth sensor to hold pitch attitude of said spacecraft during the portion of the orbit of said spacecraft that the sun is behind the earth.

11. The system as claimed in claim 10 wherein said control means are adapted to enable said Polaris star tracker to read rollout and yaw attitude during the portion of the orbit of the spacecraft that the sun is behind the earth.

12. The system as claimed in claim 6 wherein said earth sensor concurrently reads the pitch attitude of the earth together with the Polaris star tracker during portions of the orbit of said spacecraft that the sun is not behind the earth.

13. The system as claimed in claim 6 wherein said control means includes data processing means comprising at least one CPU (central processing unit) coupled to at least one said earth sensor, at least one sun sensor, and at least one said Polaris star tracker.

14. The system as claimed in claim 13 wherein said data processing means comprises six of said sun sensors, one said Polaris star tracker, and one said earth sensor coupled to three of said CPUs (central processing units).

15. The system as claimed in claim 14 wherein said three CPUs are coupled to said six sun sensors, said one earth sensor, and said one Polaris star tracker by an analog to digital converter.

16. The system as claimed in claim 6 wherein said control means is adapted to selectively interchange one of said first, second and third sensors with another of said first, second and third sensors.

17. The system as claimed in claim 16 wherein said control means is adapted to interchange said sensors during different portions of the orbit of said spacecraft and during different times of the year.

18. A system for three axis attitude readout for a geosynchronously orbiting spacecraft, said system comprising:
    a first sensor comprising a two axis sun sensor;
    a second sensor consisting of a two axis Polaris star tracker;
    a third sensor comprising an infrared single axis earth sensor;
    control means operatively associated with said first, second and third sensors for selectively actuating at least one of said first, second and third sensors during selected portions of the orbit of said spacecraft around the earth and during selected times of the year that said spacecraft is orbiting the earth; and
    means operatively associated with said sun sensor and said Polaris star tracker for calibrating said earth sensor for eliminating error from said earth sensor.

19. The system as claimed in claim 18, wherein said control means comprises data processing means including at least three central processing units (CPUs) coupled to six said sun sensors, one said Polaris star tracker, one said earth sensor through at least one analog to digital converter.

20. A system for three axis attitude readout for a geosynchronous orbiting spacecraft, said system comprising:
    a first sensor comprising a sun sensor;
    a second sensor consisting of a Polaris star tracker;
    a third sensor comprising an earth sensor; and
    control means operatively associated with said first, second and third sensors for selectively actuating one of said first, second and third sensors;
    wherein said sun sensor and said Polaris star tracker comprise a quad silicon detector and a LED (light emitting diode) element for illuminating four detector elements.

21. A system for three axis attitude readout for a geosynchronously orbiting spacecraft, said system comprising:
    a first sensor comprising a two axis sun sensor;
    a second sensor consisting of a two axis Polaris star tracker;
    a third sensor comprising an infrared single axis earth sensor; and
    control means operatively associated with said first, second and third sensors for selectively actuating at least one of said first, second and third sensors during selected portions of the orbit of said spacecraft around the earth and during selected times of the year that said spacecraft is orbiting the earth;
    wherein said sun sensor and said Polaris star tracker comprise a quad silicon detector and a LED (light emitting diode) element for illuminating four detector elements.

* * * * *